United States Patent
Kocka

(10) Patent No.: US 7,797,671 B2
(45) Date of Patent: Sep. 14, 2010

(54) LAYERED OBJECT BASED SOFTWARE ARCHITECTURE FOR STATECHART-CENTRIC EMBEDDED DEVICE CONTROLLERS

(75) Inventor: Alan C. Kocka, Melville, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 1366 days.

(21) Appl. No.: 11/129,895

(22) Filed: May 16, 2005

(65) Prior Publication Data

US 2005/0262473 A1 Nov. 24, 2005

Related U.S. Application Data

(60) Provisional application No. 60/572,662, filed on May 19, 2004.

(51) Int. Cl.
  *G06F 9/44* (2006.01)
  *G05B 15/02* (2006.01)
(52) U.S. Cl. .................... 717/104; 717/106; 717/109; 700/9
(58) Field of Classification Search .................. None
  See application file for complete search history.

(56) References Cited

U.S. PATENT DOCUMENTS

| 5,724,272 | A | 3/1998 | Mitchell et al. | |
|---|---|---|---|---|
| 6,119,125 | A | 9/2000 | Gloudeman et al. | |
| 6,345,387 | B1 | 2/2002 | Morrison | |
| 6,487,208 | B1 * | 11/2002 | Chirashnya et al. | 370/400 |
| 6,499,062 | B1 | 12/2002 | Shteyn | |
| 6,760,734 | B1 * | 7/2004 | Stephens | 707/102 |
| 6,880,147 | B1 * | 4/2005 | Pauly | 717/104 |
| 7,400,276 | B1 * | 7/2008 | Sotiriadis et al. | 341/61 |
| 2002/0143511 | A1 * | 10/2002 | Iwamasa | 703/17 |
| 2003/0014439 | A1 * | 1/2003 | Boughannam | 707/513 |
| 2003/0090018 | A1 * | 5/2003 | Bulgrin | 264/40.1 |
| 2004/0073413 | A1 * | 4/2004 | Aberg et al. | 703/2 |
| 2006/0221081 | A1 * | 10/2006 | Cohen et al. | 345/473 |
| 2007/0282593 | A1 * | 12/2007 | Thompson et al. | 704/9 |

OTHER PUBLICATIONS

Yacoub and Ammar, "A Pattern Language of Statecharts", 1998, Third Conference on Pattern Languages of Programming and Computing.*

Lazareviae and Miliev "Finite State Machine Automatic Code Generation" 2000, available at <http://citeseerx.ist.psu.edu/viewdoc/summary?doi=10.1.1.40.4600> as of Jun. 21, 2009.*

Ayvazyan et al. "FInite State MAchine Implementation to automate RF operation at the TESLA Test Facility", 2001, Proceedings of the 2001 Particle Accelerator Confernece, pp. 286-288.*

(Continued)

*Primary Examiner*—Jason D Mitchell
(74) *Attorney, Agent, or Firm*—Renner, Otto, Boisselle & Sklar, LLP

(57) ABSTRACT

A computer software architecture for an embedded computer system. The architecture includes a hierarchy of software object classes. One classification contains object tables which capture device control law behavior expressed in statecharts. Another contains objects which collaborate to function as a logic engine for processing statechart information encoded into object tables. In order to promote reusability, the architecture is layered in increasing levels of system abstraction.

13 Claims, 4 Drawing Sheets

OTHER PUBLICATIONS

Wagner "VFSM executable specification", 1992, Proceedings CompEuro '92, 'Computer Systems and Software Engineering', pp. 226-231.*

European Search Report for corresponding Application No. EP 05 25 3084 dated Oct. 3, 2007.

F. Wagner; Institute of Electrical and Electronics Engineers: "VFSM Executable Specification," Proceedings of the Annual European Conference on Computer Systems and Software Engineering; May 1992.

D.T. Lee; "Evaluating Real-Time Software Specification Languages," Computer Standards and Interfaces; Nov. 2002; Abstract, pp. 395, 396, 398, 399.

Myport; "Object Oriented Programming and Classes"; 2003.

Marcio S. Dias et al.; "Software Architecture Analysis based on Statechart Semantics"; Information and Computer Science; University of California, Irvine, CA. (Date unknown).

Ward & Mellor, "Structured Development for Real-Time Systems", vols. 1 and 2, Prentice-Hall, NJ; pp. 47-48; 1985.

* cited by examiner

LAYERED OBJECT BASED SOFTWARE ARCHITECTURE FOR STATECHART-CENTRIC EMBEDDED DEVICE CONTROLLERS

This application claims priority under 35 U.S.C. §119 to U.S. Provisional Application No. 60/572,662, filed May 19, 2004, the contents of which are hereby incorporated by reference.

TECHNICAL FIELD

The present invention relates to systems and methods for capturing device controller control laws in embedded computer systems.

BACKGROUND OF THE INVENTION

Over the years, the responsibility for device control (e.g., pumps, valves, actuators and the like) has migrated to embedded processors. The traditional way of capturing the behavioral requirements for a device controller was with textural descriptions. While this approach worked for simple devices, it failed when confronted with more complex behaviors. Recognizing that device controller behavior is state oriented, coupled with the advent of powerful state machine modeling tools, capturing the behavior requirements in verifiable statecharts soon became the method of choice.

While there are many ways to design embedded software that will carry out device control laws, they tend to be designed around the specific device functions, resistant to requirement changes, and do not take advantage of the statechart modeling environment. What is lacking is a sophisticated software architecture that embeds the actual statechart behavior, is designed for rapid change processing, and can be used with a family of devices.

SUMMARY OF THE INVENTION

The present invention constitutes a radical departure from conventional embedded device controller design solutions pursued previously, such as those described above.

According to one aspect of the invention, a computer software architecture is provided for capturing the properties and behavior of device control laws expressed in the form of state charts within a machine-implemented embedded device control application. The architecture includes a condition class for capturing one or more sets of conditions present in statechart models; an action class for capturing actions to be performed while in a particular state; a transition class for capturing sets of transitions between states; a group of state classes for capturing parallel state and sub-state interrelationships within a statechart; and a class for capturing time delays between state transitions.

In accordance with another aspect of the invention, a computer software architecture is provided for processing control laws expressed in the form of state charts within a machine-implemented embedded device control application. The architecture includes an event recognition layer including at least one event recognizer object; a state determination layer including at least one state controller object; an event response layer including at least one event responder object; and a logic engine including a condition recognizer object, a logic parser object and a temporary storage object.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
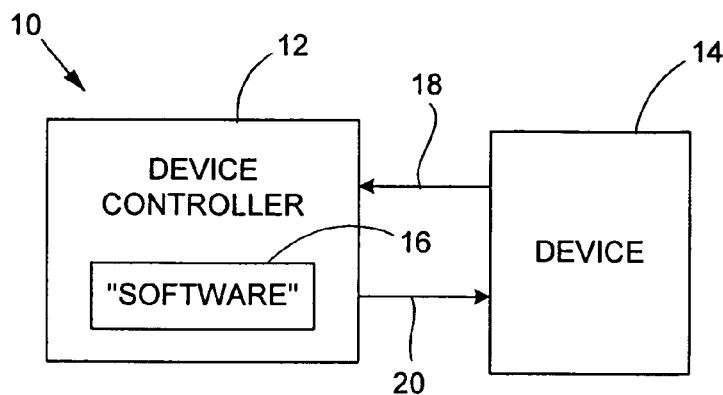
FIG. 1 is a block diagram of a device and device controller with a layered object based software architecture in accordance with an exemplary embodiment of the present invention.

The present invention will now be described with reference to the drawings, wherein like reference numerals are used to refer to like elements throughout.

Although the invention is described herein with reference to a specific embodiment such as an embedded device controller, this is for purposes of illustration and clarity only, and should not be construed in a limiting sense. Those skilled in the art will readily appreciate that the invention can be generally utilized with any application wherein state oriented behavior is a parameter of primary interest. Furthermore, the invention is not limited to a particular style of statechart modeling, and can accommodate both Mealy and Moore styles within the same model.

Referring initially to FIG. 1, a device control system 10 is shown in accordance with an exemplary embodiment of the present invention. The system 10 includes a device controller 12 which controls a device 14. The device 14 may be any type of device without departing from the scope of the invention. For example, the device 14 may be a discrete device such a motor, pump, valve, actuator, etc. Alternatively, the device 14 may be a system or sub-system such as a brake control system, traction control system, monitoring system, etc.

The device controller 12 may be any type of automated controller without departing from the scope of the invention. For example, the device controller 12 may be based upon any of a variety of micro-type controllers such as commercially available microcontrollers, microprocessors, etc. In addition, or in the alternative, the device controller 12 may be based upon larger controllers in the form of a dedicated personal computer, server, mainframe, etc. Still further, the device controller 12 may be based on configured hardware such as a programmable logic array (PLA), programmable logic controller (PLC), or the like.

Furthermore, the device controller 12 is programmable in accordance with the layered object based software architecture of the present invention. As will be described in more detail below, the software architecture of the present invention is a layered architecture for processing control laws of the device 14 expressed in the form of state charts. The software architecture may be embodied in machine executable code which is executed by the device controller 12. The machine executable code is stored in an information storage medium such as digital memory (volatile or non-volatile), magnetic disk, optical disk, floppy disk, etc., represented generally by 16, which is accessed and executed by the device controller 12. Alternatively, the software architecture may be embodied in the hardware design of the PLA, PLC, etc., again represented generally by 16.

In the exemplary embodiment of the present invention, the device controller 12 is an embedded device controller. In the context of the present invention, "embedded device controller" refers to a controller 12 which controls the device 14, wherein the device 14 may or may not be part of a larger system.

As is shown in FIG. 1, the device controller 12 issues control commands to the device 14 as represented by line 20. In addition, the device controller 12 receives control signals from the device 14 as represented by line 18. In a case where the device 14 is a motor, for example, the control commands may turn the motor on, off and vary the speed of the motor. The control signals, on the other hand, may indicate operation properties such as motor position, measured speed, current, etc. The software architecture of the present invention, as embodied in the device controller 12, provides for control of the device 14 based on the state charts defining the operation of the device 14.

Figure 2:
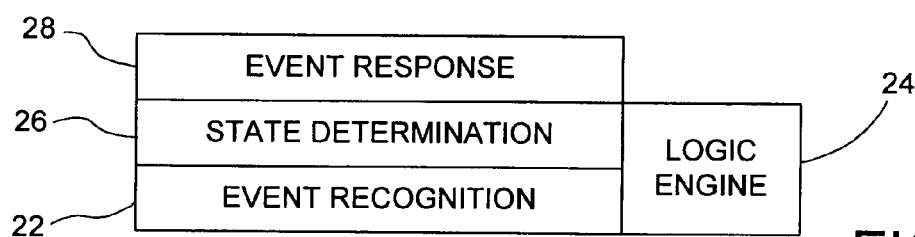
FIG. 2 illustrates respective layers of the object based software architecture in accordance with the exemplary embodiment of the present invention.

Referring now to FIG. 2, the embedded computer software architecture of the present invention is illustrated in its respective layers. Specifically, the software architecture of the present invention provides for performing the three main functions required within the domain of device controllers: event recognition, state determination, event response. The architecture includes an event recognition layer 22 of software objects having responsibility for detecting the occurrence of events that may trigger a change in the current state of the controller 12.

The event recognition layer 22 makes use of a logic engine 24 included within the software architecture. The logic engine 24 is composed of objects that can process logical expressions of parameters encoded in Reverse Polish Notation (RPN) or other tabular parsable format, for example. However, it will be appreciated that other forms of logical expressions are possible without departing from the scope of the invention. The software architecture further includes a state determination layer 26 having objects for condition evaluation, state determination and object coordination. The state determination layer 26 also makes use of the logic engine 24 objects. The software architecture additionally includes an event response layer 28. The event response layer 28 contains objects responsible for issuing the device control commands associated with the control laws of the current state of the device controller 12.

As is discussed herein, a class framework is provided for encoding the conditions, structural components and interconnections found on statecharts, into a series of classes that are embedded within the device controller 12 and are operated on by the various software architecture layers 22, 26 and 28. It will be appreciated that a "class" as referred to herein typically defines data, data types, and operations on the data. The realization of a specific case of a class or classes is an instance of the class or classes which is referred to herein as an "object".

The software architecture of the present invention provides a direct correlation between the device control requirements modeled in statechart format and the embedded device control software. One having ordinary skill in the art of object based programming will appreciate that the requirements may be modeled in a tool that uses standard statechart notation, and a utility can be written to extract the statechart elements from the tool and automatically populate the statechart class framework objects. The use of the architecture set forth herein in accordance with the present intention improves behavioral verification and end user understandability since the parameters within the embedded controller 12 directly correlate to elements within the requirements model. This software architecture also makes changes to the requirements easier to achieve by encoding the statechart elements into software structures rather than in-line code.

The implementation of the logic engine 24 along with the event recognition layer 22 and state determination layer 26 provide strong support for reuse by being device independent thereby allowing the same architecture to support families of device controllers.

Figure 3:
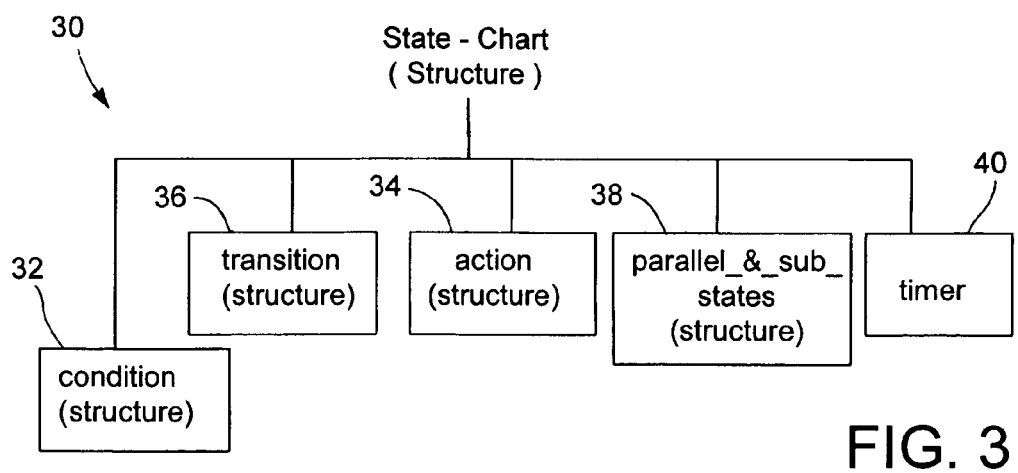
FIG. 3 illustrates the class structure used to capture statechart parametrics in accordance with the exemplary embodiment of the present invention.
Figure 4:
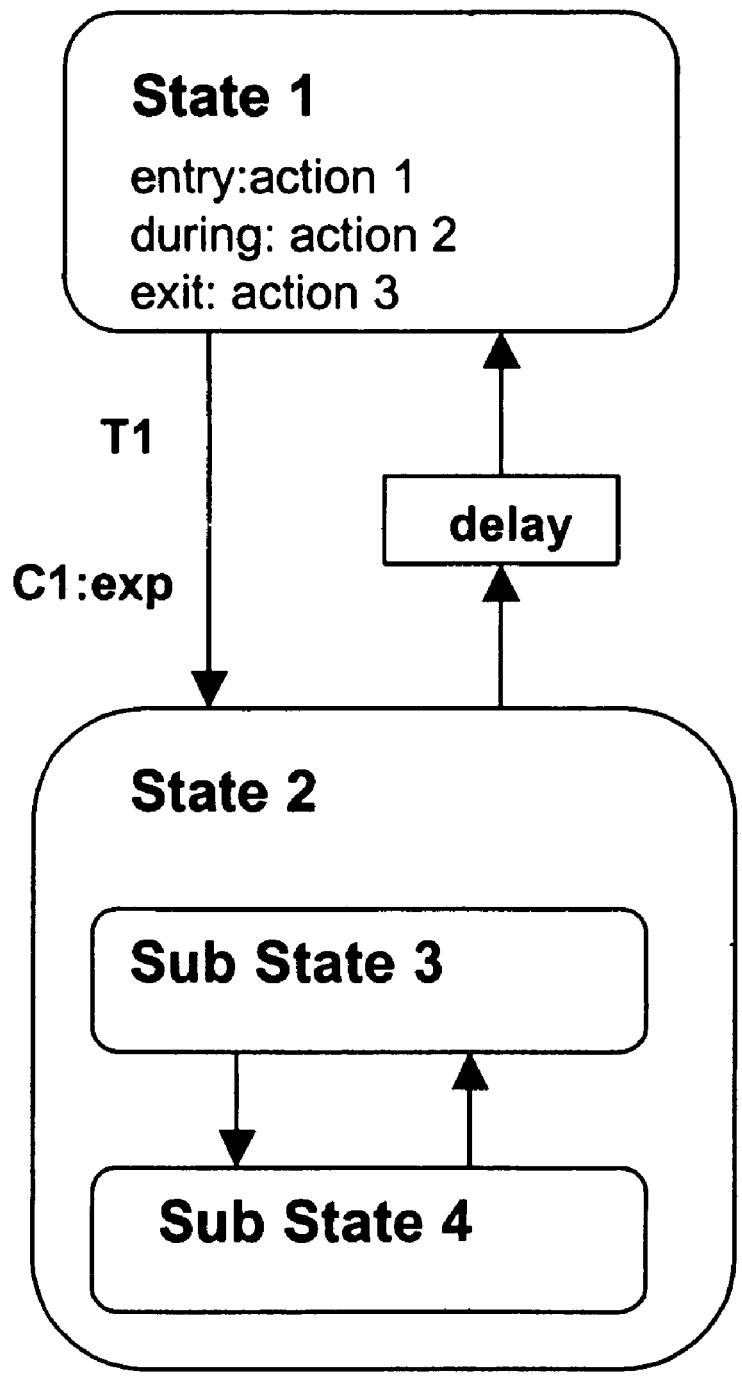
FIG. 4 is a state diagram illustrating exemplary statechart parametrics represented in the class structure shown in FIG. 3 in accordance with the exemplary embodiment of the present invention.

With reference to FIG. 3, a simplified class diagram is provided to define the overall structure 30 and relationship of the embedded objects used to capture the various elements of a typical statechart. A generic statechart is provided for reference purposes in FIG. 4. Referring to FIG. 3, the structure 30 includes a condition class 32 provided to capture one or more sets of conditions. These conditions (including action expressions) are encoded in RPN and are used to determine whether or not a transition can be taken as well as for evaluating the assignment statement(s) for any "entry", "during" or "exit" actions associated with a state. (See, e.g., State 1 in FIG. 4). The structure 30 also includes an action class 34 provided to capture the actions to be performed while in a particular state. The expressions are encoded in RPN or other tabular parsable format and handled the same as conditions in the condition class 32. For each state, the structure 30 identifies a link, such as an index, into the set of conditions for the entry, during and exit expressions associated with the state. A transition class 36 is included to capture the sets of transitions between states. Each transition (e.g., T1 in FIG. 4), is identified via a "From State" and a "To State" as well as with an index of a condition (e.g., C1:exp in FIG. 4) used to evaluate if the transition should be taken.

The set of transitions for a parallel state are grouped together. Since Harel's extensions to finite statemachine theory are embodied within most modern statechart modeling tools, the structure 30 of the present invention provides a group of state classes, e.g., a parallel and sub-states class 38, for capturing both parallel state and sub-state interrelationships within a statechart. (See, e.g., State 2 in FIG. 4). Because of the nature of real-time embedded controllers 12, delays between transitions may need to be modeled. Accordingly, the structure 30 includes a class 40 to capture these requirements. (See, e.g., delay in FIG. 4). The state chart model may also contain tables of logical expressions (conditions) captured within the condition class 32, for example, whose resulting parameters appear within the body of the state chart.

Figure 5:
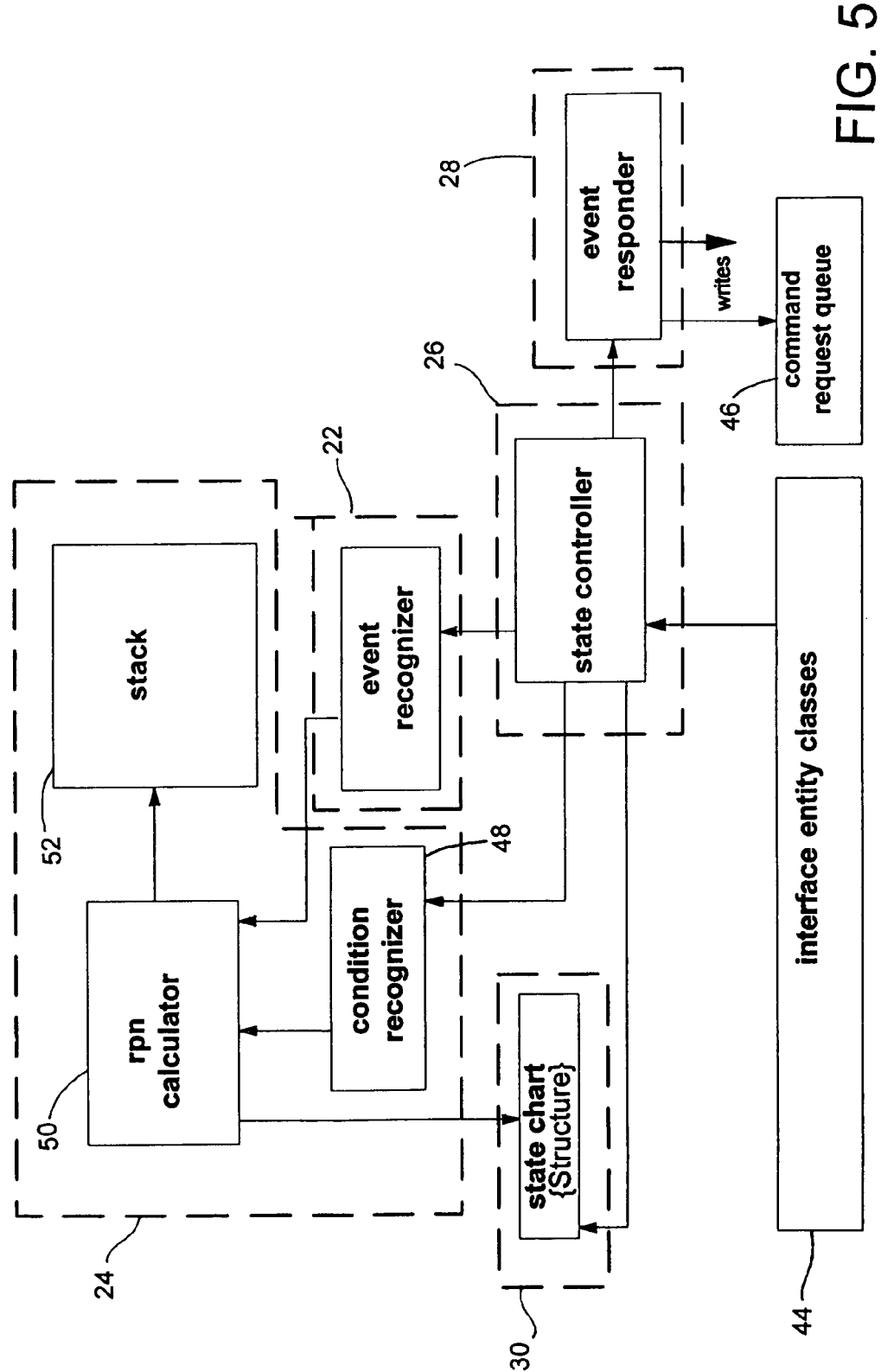
FIG. 5 is a block diagram representing the class framework for a logic engine that processes statechart parametrics in accordance with the exemplary embodiment of the present invention.

Referring now to FIG. 5, in the exemplary embodiment of the invention, the statechart objects described above in relation to FIG. 3 are coupled with the objects of the event recognition layer 22 (consisting, for example, of a single event recognizer object), the state determination layer 26

(consisting, for example, of a single state controller object), and the event response layer 28 (consisting, for example, of a single event responder object), as well as to the logic engine objects 24, to make a complete framework for processing the statechart control logic. A class diagram of the exemplary embodiment of the framework is shown in FIG. 5, with interface entity classes 44 and a command request queue class 46, included as an example of how the framework would interface to the rest of an application architecture. The objects in each of these layers, as well as the coordination of their operations by the state controller object in the state determination layer 26 are discussed in greater detail below. Although the exemplary embodiment includes only a single object in the respective layers for sake of brevity, it will be appreciated that each layer may include any number of objects without departing from the scope of the invention.

The individual functions of the state controller object within the state determination layer 26 include retrieving data from the entity classes 44 that is required to evaluate all of the conditions contained within the state chart structure 30, determining the current state of operation based on the state charts, and using this information to generate a device(s) command(s) appropriate for the current state. The state controller class within the state determination layer 26 also coordinates the activities of a condition recognizer object 48, the event recognizer object of the event recognition layer 22, and the event responder object of the event response layer 28.

The condition recognizer object 48 is part of the logic engine 24, and is responsible for evaluating sets of tabularized logical expressions used to set parameters which appear within the body of the state chart 30.

The event recognizer object within the event recognition layer 22 is responsible for evaluating the state transition criteria contained within the state chart 30, and determining when a transition can be made to a new state based on the evaluated conditions. Once the current state is determined, the event recognizer in the event recognition layer 22 performs any associated entry, exit or during actions, which are stored in the action object 34 within the state chart structure 30.

The event responder object within the event response layer 28 assembles device commands from the state controller object in the state determination layer 26, resolves any conflicts (conflicts can arise in complex applications in which a device may receive commands from multiple sources, in which case a priority scheme can be used) and queues the resulting command(s) for output to the device 14 via the command request queue 46.

Both the event recognizer object in the event recognition layer 22 and the condition recognizer object 48 use a logic parser such as an rpn calculator object 50 included in the logic engine 24 to evaluate their logical expressions. The rpn calculator object 50 is responsible for evaluating a tabular expression stored in Reverse Polish Notation, for example. It returns the result of the evaluation to the calling object. For added flexibility the rpn calculator object 50 in the exemplary embodiment of the invention supports boolean, integer and floating point parameters, which are common data types within embedded controller systems.

A temporary storage object such as a stack object 52 also included in the logic engine 24 is utilized by the rpn calculator object 50 when performing its evaluations. The stack object 52 provides a last in first out (LIFO) storage mechanism for Boolean or numeric data. In the exemplary embodiment of the invention, the stack object 52 provides the classic stack operations of read, write and empty (e.g., push, pop and is empty).

The layered object based state chart architecture described above not only meets the needs of the device controller domain, but is also capable of application as a generalized logic engine. Through the software architecture, a number of domain characteristics and advantages have been identified. For example, the system is tolerant to changes made to the statechart because they result in table object changes which therefore eliminates the need to re-verify the code within the various object layers. Since the objects within the various layers provide functions related to logic processing rather than operations functions, the system is highly reusable, thus providing improved long-term affordability and efficiency.

Figure 6:
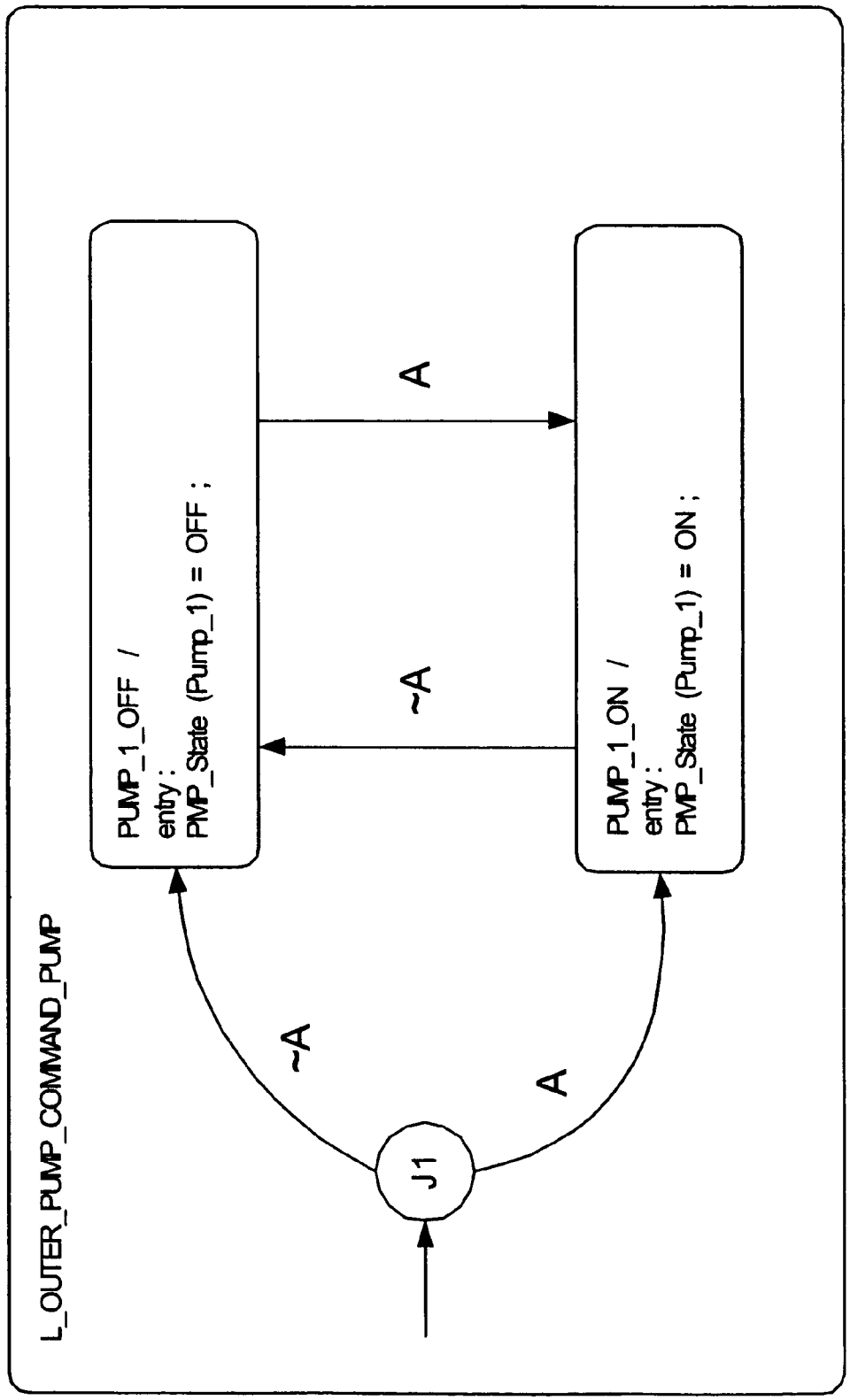
FIG. 6 is a state diagram representing control of a pump according to one particular example of the present invention.

Turning now to FIG. 6, an exemplary statechart diagram for controlling a pump device 14 between an on state and an off state is shown. In accordance with the software architecture of the present invention, the condition class 32 (FIG. 3) may be populated as follows:

CONDITION (Structures)

```
static const CONDITION_T pv_transition_conditions[4] =
{
    /* (index 1) L_OUTER_PUMP_COMMAND_PUMP_J1 ->
    PUMP_1_OFF */
    BOOL_PTR, 1, NOT_CODE, END_CODE,
    /* (index 2) L_OUTER_PUMP_COMMAND_PUMP_J1 ->
    PUMP_1_ON */
    BOOL_PTR, 1, END_CODE,
    /* (index 3) PUMP_1_ON -> PUMP_1_OFF */
    BOOL_PTR, 1, NOT_CODE, END_CODE,
    /* (index 4) PUMP_1_OFF -> PUMP_1_ON */
    BOOL_PTR, 1, END_CODE
}
```

Similarly, the transition class 36 (FIG. 3) may be populated as follows:

TRANSITION (Structures)

```
static const TRANSITION_DEFINITION_T
pv_transition_definitions[5] =
{
{ L_OUTER_PUMP_COMMAND_PUMP,
    L_OUTER_PUMP_COMMAND_PUMP_J1,
    JUNCTION, NO_ENTRY, NO_ENTRY },
    { L_OUTER_PUMP_COMMAND_PUMP_J1,
    PUMP_1_OFF, NO_JUNCTION, 1, NO_ENTRY },
    { L_OUTER_PUMP_COMMAND_PUMP_J1, PUMP_1_ON,
NO_JUNCTION, 2, NO_ENTRY },
    { PUMP_1_ON, PUMP_1_OFF, NO_JUNCTION, 3,
    NO_ENTRY },
    { PUMP_1_OFF, PUMP_1_ON, NO_JUNCTION, 4,
    NO_ENTRY }
}
```

The action class 34 (FIG. 3) may be defined as follows:

ACTION (Structures)

```
static const ACTION_DEFINITION_T pv_action_definitions[997] =
{
    /* PUMP_1_ON entry (index 1) */
    BOOL_CODE, ON, SET_BOOL_PTR, 2, END_CODE,
    /* PUMP_1_OFF entry (index 2) */
    BOOL_CODE, OFF, SET_BOOL_PTR, 2, END_CODE
}
static const INDEX_T pv_action_indices[4] =
{
    /* entry, during, exit */
    -1, -1, -1,        /* L_OUTER_PUMP_COMMAND_PUMP */
```

-continued

```
-1,-1,-1,        /* L_OUTER_PUMP_COMMAND_PUMP_J1 */
2,-1,-1,         /* PUMP_1_OFF */
1,-1,-1,         /* PUMP_1_ON */
}
```

The parallel and sub-states class 38 (FIG. 3) may be populated as follows:

PARALLEL & SUB STATES (Structure)

```
typedef enum pv_state_names_t
{
L_OUTER_PUMP_COMMAND_PUMP,
L_OUTER_PUMP_COMMAND_PUMP_J1,
PUMP_1_OFF,
PUMP_1_ON
}
```

For sake of efficiency, and thus avoid the need to copy data elements, a pointer table may be provided and each element of the state chart assigned a pointer ID. Although not necessary to the present invention, it will be appreciated that the pointer table may be included as part of the state chart structure 30. In the exemplary application, the pointer table may be defined as follows:

POINTER Table

```
static BOOLEAN_T *const pv_common_boolean_ptrs[2] =
/* 1 */   &A,
/* 2 */   &PMP_State[Pump_1]
```

The RPN calculator 50 in the logic engine 24 may be configured as follows:

RPN CALCULATOR

```
Description:
// Given a pointer to a tabularized condition in RPN and a table of
// pointers to variables to be used to evaluate the condition, the
// evaluate operation walks through the operands and operators in
// the condition, performing the required operations, and returns
// the result of the condition
/* Evaluate all codes for requested condition */
    code_ptr = condition_ptr;
    while ((code_ptr != 0) && (*code_ptr != (CONDITION_T) END_CODE))
    {
       switch (*code_ptr)
       {
         case BOOL_PTR:
           /* Push referenced value onto boolean stack */
           if (++code_ptr != 0)
           {
              if (variable_ptrs->boolean_ptrs[*code_ptr] != 0)
              {
                 temp_bool1 = *(variable_ptrs-
                      >boolean_ptrs[*code_ptr]);
                 stack_push_boolean( temp_bool1 );
              }
           }
           break;
         case SET_BOOL_PTR:
           /* Assign top of stack to referenced value */
           if (++code_ptr != 0)
           {
              if (variable_ptrs->boolean_ptrs[*code_ptr] != 0)
              {
                 temp_bool1 = stack_pop_boolean( );
                 *(variable_ptrs->boolean_ptrs[*code_ptr]) =
                     temp_bool1;
              }
           }
           break;
         .
         .
         .
         case BOOL_CODE:
           /* Push next value onto boolean stack */
           if (++code_ptr != 0)
           {
              stack_push_boolean( (BOOLEAN_T) *code_ptr );
           }
           break;
         .
         .
         .
         case NOT_CODE:
           /* Negate the top boolean stack value, push result */
           temp_bool1 = stack_pop_boolean( );
           if (FALSE == temp_bool1)
           {
              stack_push_boolean( TRUE );
           }
           else
           {
              stack_push_boolean( FALSE );
           }
           break;
         .
         .
         .
         case END_CODE:
           break;
         default:
           /* Issue appropriate error */
           appbite_report_status( UNKNOWN_OPCODE_FAULT,
    FAIL, snapshot );
           break;
       }
       code_ptr++;
    }
    if ( stack_is_empty ( BOOLEAN_STACK ) )
    {
       result = FALSE;
    }
    else
    {
       /* Return top of boolean stack as the final result */
       result = stack_pop_boolean( );
    }
    return result;
}   /* rpn_calculator_evaluate */
```

The device controller 12 as shown in FIG. 1 may be programmed as set forth above in order to control a the pump 14, as will be appreciated by those having ordinary skill in the art of programmable controls. Accordingly, additional detail is omitted herein for sake of brevity.

As previously noted, the software architecture of the present invention provides a direct correlation between the device control requirements modeled in statechart format and the embedded device control software. One having ordinary skill in the art of object based programming will appreciate that the requirements may be modeled in a tool that uses standard statechart notation, and a utility can be written to extract the statechart elements from the tool and automatically populate the statechart class framework objects. The use of the architecture set forth herein improves behavioral verification and end user understandability since the parameters within the embedded controller 12 directly correlate to elements within the requirements model. This software architecture also makes changes to the requirements easier to achieve by encoding the statechart elements into software structures rather than in-line code.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A device control system for controlling a device, comprising:
   a device controller that carries out object-based executable code to issue control commands to the device based on control signals received from the device;
   a state chart structure having tabular state charts that contain logical expressions encoded in reverse polish notation or tabular parsable format, the logical expressions expressing properties and behavior of control laws for the device; wherein the tabular state charts of the state chart structure include:
      a condition table with logical expressions that capture one or more sets of conditions present in state chart models;
      an action table with logical expressions that capture actions to be performed while in a particular state;
      a transition table with logical expressions that capture sets of transitions between states;
      a parallel state and sub-state table with logical expressions that capture interrelationships within the state chart models; and
      a timer table with logical expressions that capture delays between state transitions; and
      wherein the logical expressions of the tables are indexed against each other; and
   an information storage medium in which the executable code and the state chart structure are stored, the executable code is arranged in a layered object-based architecture as a generalized logic engine that is tolerant to changes made to the tabular state charts without re-verification, the executable code including:
      an event recognition layer having at least one event recognition object configured to detect the occurrence of a device event that triggers a change in the state of the device controller;
      a state determination layer including at least one state controller object for condition evaluation, state determination and object coordination;
      an event response layer including at least one event response object configured to issue the control commands to the device;
      a logic engine including a conditional recognition object, a logic parser object and a temporary storage object, the logic engine further including objects that process the logical expressions of the tabular state charts; and
      wherein the event recognition layer and the state determination layer make use of the logic engine objects to evaluate the tabular state charts to set parameters that appear in the state chart structure and drive the event response layer to issue the control commands to the device.

2. The control apparatus of claim 1, wherein for each state, a structure of the action table identifies an index into a set of conditions for entry, during and exit expressions corresponding to the state, which are encoded in a tabular parsable format.

3. The control apparatus of claim 1, wherein each transition within the transition table is identified via a From State and a To State as well as with a link to a condition within the condition table evaluated to determine if the transition should be taken.

4. The control apparatus of claim 1, wherein both parallel state and sub-state interrelationships within a state chart are captured within the parallel state and substate table.

5. The control apparatus of claim 1, wherein delays of the timer table are each linked to a transition within the transition table.

6. The control apparatus of claim 1, wherein the event recognition layer includes an event recognizer object responsible for evaluating state transition criteria contained within the state charts and performing associated entry, exit and during actions, which are stored in an action object.

7. The control apparatus of claim 1, wherein the state determination layer includes a state controller object responsible for retrieving data from entity classes, determining a current state of operation based on the state charts, and using this information to generate one or more device commands appropriate for the current state.

8. The control apparatus of claim 1, wherein the state determination layer includes a state controller object responsible for coordinating the activities of the condition recognizer object, the event recognizer object and the event responder object.

9. The control apparatus of claim 1, wherein the event responder layer includes an event responder object responsible for assembling device commands from the state controller object, resolving any command conflicts and queuing the resulting commands.

10. The control apparatus of claim 1, wherein the logic parser object returns a result of the evaluation to a calling object.

11. The control apparatus of claim 1, wherein the logic engine includes a logic parser object configured to process Boolean, integer and floating point parameters.

12. The control apparatus of claim 1, wherein the logic engine includes a temporary storage object responsible for providing a storage mechanism for Boolean or numeric data along with read, write and empty operations.

13. The control apparatus of claim 1, wherein the device is a pump and the control apparatus is a pump controller.

* * * * *